(12) United States Patent
Morales et al.

(10) Patent No.: US 10,432,017 B1
(45) Date of Patent: Oct. 1, 2019

(54) UNINTERRUPTABLE POWER SUPPLY (UPS) MANAGEMENT

(71) Applicant: Amazon Technologies, Inc., Seattle, WA (US)

(72) Inventors: Osvaldo P. Morales, Seattle, WA (US); Michael P. Czamara, Seattle, WA (US); Stephen Roy Jenkins, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 740 days.

(21) Appl. No.: 15/070,969

(22) Filed: Mar. 15, 2016

(51) Int. Cl.
*H02J 9/00* (2006.01)
*H02J 9/06* (2006.01)
*H02J 7/00* (2006.01)
*G05B 15/02* (2006.01)

(52) U.S. Cl.
CPC ............. *H02J 9/061* (2013.01); *G05B 15/02* (2013.01); *H02J 7/007* (2013.01); *H02J 7/0068* (2013.01)

(58) Field of Classification Search
CPC .......... H02J 9/061; H02J 7/0068; H02J 7/007; H02J 9/062; H02J 9/066; H02J 1/108; H02J 9/06; G05B 15/02; H02M 1/10
USPC ........................................................ 307/23
See application file for complete search history.

(56) References Cited

U.S. PATENT DOCUMENTS

| 9,823,721 | B1 * | 11/2017 | McGee | G06F 1/30 |
| 9,965,013 | B1 * | 5/2018 | McGee | H02J 9/00 |
| 2006/0006739 | A1 * | 1/2006 | Gonzales | G06F 1/30 307/66 |
| 2008/0114499 | A1 * | 5/2008 | Hakim | G06Q 50/06 700/291 |
| 2010/0174417 | A1 * | 7/2010 | Iida | H01M 10/425 700/292 |
| 2014/0379160 | A1 * | 12/2014 | Fallon | G06Q 50/06 700/297 |
| 2015/0180233 | A1 * | 6/2015 | Yamada | H02J 1/08 307/23 |
| 2016/0077570 | A1 * | 3/2016 | Varadarajan | H02J 9/002 713/322 |

OTHER PUBLICATIONS

"Powerware series: ABM Technology", Eaton Corporation, 2009, pp. 1-2.
U.S. Appl. No. 14/463,476, filed Aug. 19, 2014, Huyen Van Nguyen.
U.S. Appl. No. 14/657,811, filed Mar. 13, 2015, Huyen Van Nguyen.

* cited by examiner

*Primary Examiner* — Thienvu V Tran
*Assistant Examiner* — Brian K Baxter
(74) *Attorney, Agent, or Firm* — Robert C. Kowert; Meyertons, Hood, Kivlin, Kowert & Goetzel, P.cC.

(57) ABSTRACT

A data center includes an electrical load, a connection to a utility power source, a uninterruptible power supply (UPS), a switching device and a control system. The control system is configured to cause the switching device to discontinue routing electrical power to the electrical loads via the UPS for a given period of time while electrical power is still available to be fed to the electrical loads from the utility power source. Subsequent to the given period of time, the control system cause the switching device to resume routing electrical power to the electrical loads via the UPS.

17 Claims, 7 Drawing Sheets

UNINTERRUPTABLE POWER SUPPLY (UPS) MANAGEMENT

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage. A network of cabling, bus bars, power connectors, and power distribution units, is used to deliver the power at the lower voltage to numerous specific components in the facility.

A computing facility may receive one or more power feeds from one or more external power sources. For example, a power feed may originate from a utility power source. The power feed originating from a utility power source may be passed along power transmission lines at a high voltage (e.g., 115 kilovolts) to an electrical substation, which may include a transformer that can step down the power feed voltage to a lower voltage and supply the power feed to the computing facility. Power feeds may be stepped down by a substation transformer to a low voltage (e.g., 480 volts) or a medium voltage that is distributed to additional transformers to be stepped down further to a low voltage.

From time to time, a power feed from an external power source may experience disturbances that may interrupt normal receipt of power at the computing facility. For example, a lightning strike may cause a brief fluctuation in the power feed received at the facility. In another example, the power feed may become unstable such that it becomes unusable by the facility. In another example, an unexpected fluctuation in a power feed may damage downstream electrical equipment. In a further example, a power feed may fail altogether.

In many cases, a computing facility may include a low-voltage backup power source that can temporarily supply backup power to the facility in the event that a power feed from an external power source is lost. For example, a computing facility can include an uninterruptible power source (UPS), such as a battery, which can provide an uninterruptible supply of power for a period of time.

In many cases, a computing facility may be charged a variable rate by utility power providers for electric power provided to the facility. For example, a price per kilowatt-hour of electricity consumed at a computing facility may vary throughout a day or throughout a year based on overall market demand such that the computing facility pays higher costs per kilowatt-hour of electricity for electricity consumed during peak times of day or seasons of the year. Also, in many cases utility power providers may charge a computing facility a demand charge based on peak flows of electrical power to the computing facility. For example, a demand charge may be based on the highest recorded electrical flow in kilowatts occurring during 15-minute increments throughout a day. In some cases, a computing facility may be charged both demand charges for the highest flows during a day (kilowatts) and may be charged for consumption (kilowatt-hours).

Figure 1:
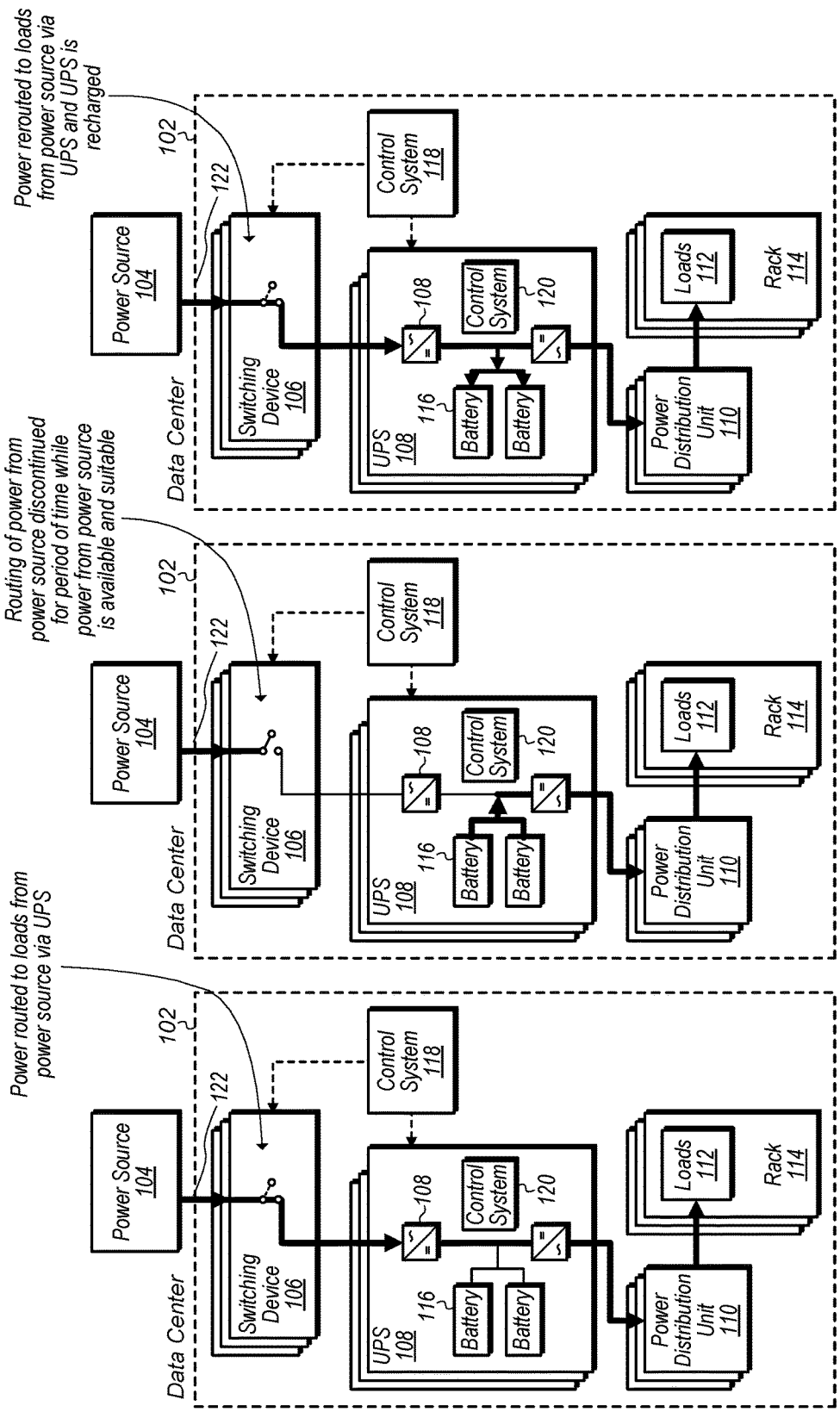
FIG. 1A is a block diagram illustrating a utility power source feeding electrical power via an uninterruptible power supply to electrical loads in a data center, according to some embodiments.
FIG. 1B is a block diagram illustrating an uninterruptible power supply feeding electrical power to electrical loads in a data center while electrical power is available from a utility power source, according to some embodiments.
FIG. 1C is a block diagram illustrating a utility power source feeding electrical power via an uninterruptible power supply to electrical loads in a data center and charging a power storage of the uninterruptible power supply, according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of systems and methods of uninterruptible power supply (UPS) management are disclosed. According to one embodiment, a data center includes an electrical load, a connection to an electrical power source that supplies electrical power to the data center, and a UPS electrically coupled to the utility power source, via the connection, and electrically coupled to the electrical load. The data center also includes a switching device electrically coupled between the connection to the utility power source and the UPS, wherein the switching device is configured to selectively route electrical power from the utility power source to the UPS. In addition, the data center includes a control system configured to command, while electrical power is available to be routed to the electrical load from the utility power source, via the connection to the utility power source, the switching device to discontinue routing electrical power from the utility power source to the electrical load, via the UPS, for a given period of time and subsequent to the given period of time, command the switching device to route electrical power from the utility power source to the electrical load via the UPS. Also, during the given period of time and while electrical power is available to be routed to the UPS from the utility power source, the UPS is configured to supply, from a battery of the UPS, electrical power to the electrical load and subsequent to the given period of time, recharge the battery of the UPS with electrical power routed to the UPS from the utility power source. For example, in some embodiments a control system may be a building management system (BMS) of a data center, and the BMS may command a switching device to temporarily discontinue feeding electrical power to a UPS in the data center for a period of time even though electrical power from a utility power source is available to be fed to the UPS. During the period of time electrical power may be fed to electrical loads from a battery of the UPS draining a portion of a charge of the battery of the UPS. Subsequently the battery of the UPS may be recharged after the BMS commands electrical power to be routed back to the electrical loads from the utility power source via the UPS. In some embodiments, feeding electrical power from a battery of a UPS from time to time may improve battery life, allow proactive detection of battery failures or anomalies, and allow for optimization of power consumption costs, among other things.

According to one embodiment, a method includes feeding electrical power from an electrical power source, via an uninterruptible power supply (UPS), to an electrical load in a data center, discontinuing to feed the electrical power from the electrical power source to the UPS while electrical power is available from the electrical power source, and instead feeding electrical power to the electrical load in the data center from a battery of the UPS. The method also includes resuming to feed electrical power from the electrical power source via the UPS to the electrical load in the data center, wherein a portion of the electrical power from the electrical power source recharges the battery of the UPS.

According to one embodiment, a non-transitory computer-readable medium stores program instructions that, when executed on a computing device, cause the computing device to receive condition information about electrical power being fed from a utility power source, via an uninterruptible power supply (UPS), to an electrical load in a data center. The program instructions also cause the computing device to, in response to determining the electrical power of the utility power source meets the reliability criteria, generate a control signal causing a switching device coupled between the electrical power source and the UPS to stop feeding electrical power to the UPS until a given condition is met and subsequent to the condition being met, generate a control signal causing the switching device coupled between the electrical power source and the UPS to resume feeding electrical power to the UPS.

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, one component in a power infrastructure is "downstream" from another component in the system if the one component receives power from the other component or is at a lower level in the system than the other component. For example, a floor power distribution unit (PDU) may be downstream from a UPS, or a data center may be downstream from a power plant.

As used herein, "floor power distribution unit" refers to a power distribution unit that can distribute electrical power to various components in a computer room. In some embodiments, a floor power distribution unit includes a transformer. In one embodiment, a floor power distribution unit includes a k-rated transformer. A power distribution unit may be housed in an enclosure, such as a cabinet.

As used herein, an "electrical load", includes the output of a power infrastructure and the electrical power consumed by some or all of the power infrastructure, including the output. For example, an electrical load in a power infrastructure may include a computing facility that consumes power distributed over the power infrastructure from a power source.

As used herein, "power distribution unit" means any device, module, component, or combination thereof, which can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.). A power distribution unit may include a transformer, power monitoring, fault detection, and isolation.

As used herein, a "power source" includes power from any source, including but not limited to power received from a utility power source that can be supplied to an electrical load. In some embodiments, a "power source" may be received from the output of a transformer. For example, a power source may include low-voltage power received from a transformer over a low-voltage power transmission line coupled to the transformer.

As used herein, "power transmission line" means a line that transmits power from one component to another component. Examples of power transmission lines include conductors that carry power from a UPS to a floor PDU, conductors that carry power from a floor PDU to a rack PDU, and conductors that carry power from a rack PDU to a server power supply unit, and power lines. Power transmission lines may have any form, such as a cable, bus bar, or other conductive member or device.

As used herein, "primary power" means any power that can be supplied to an electrical load, for example, during normal operating conditions.

As used herein, a "rack" means a rack, container, frame, or other element or combination of elements that can contain or physically support one or more computing devices.

As used herein, "rack power distribution unit" refers to a power distribution unit that can be used to distribute electrical power to various components in a rack. A rack power distribution may include various components and elements, including wiring, bus bars, connectors, and circuit breakers. In some embodiments, a rack power distribution unit may distribute power to only some of the electrical systems in a rack. In some embodiments, a single rack includes two or more rack power distribution units that distribute power to different sets of electrical systems in the rack. For example, one rack may include a left rack power distribution unit that distributes power to half of the servers in the rack, and a right rack power distribution unit that distributes power to the other half of the servers in the rack.

As used herein, "reserve power" and "backup power" may refer interchangeably to power that can be supplied to an electrical load upon the failure of, or as a substitute for, primary power to the electrical load. For example, a power feed from a backup generator may include backup power.

As used herein, "signal" includes an electrical or electromagnetic impulse, wave, tone, pulse, or combination thereof. A signal may serve to indicate, identify, inform, direct, instruct, command, or warn. A signal may be a discrete set of information (for example, a sequence of characters in a message), continuous (such as a wave), periodic, or a combination thereof. A signal may have any of various regular or irregular characteristics. In some embodiments, a signal includes one or more repeating characteristics, such as a sine wave, a square wave, or a saw tooth wave. In some embodiments, a signal has non-repeating characteristics. A signal can be applied to, or transmitted through, a single conductor or to a set of two or more conductors. In some embodiments, a signal is an electromagnetic signal transmitted through air (for example, a wireless signal). In some embodiments, a signal has characteristics of another signal. For example, a circuit may include a current, produced by an instrument transformer, which is a reduced current that is proportional to a full current in another circuit by a known or predetermined factor, such that the reduced current in the first circuit can be used to determine the full current in the other circuit.

As used herein, providing power "reserve power support" refers to providing one or more power feeds to be available to one or more downstream systems and components, including one or more electrical loads. Such provided power feeds may be precluded from being received by the systems and components but may be made available for receipt based at least in part upon a positioning of one or more components upstream of the systems and components. For example, a reserve power system may provide reserve power support to an electrical load by providing a reserve power feed that can be selectively routed to the electrical load by a transfer switch that is downstream of the reserve power system and upstream of the load, where the transfer switch may selectively route the reserve power feed or a primary power feed to the load based at least in part upon one or more conditions associated with the primary power feed.

As used herein, "switching device" includes a set of electrical switches that can break one or more electrical currents. A switching device can interrupt a power flow, divert one of the source or output of a power feed, etc. For example, a switching device assembly may selectively route or discontinue to route a power feed from a power source to a power output.

As used herein, one component in a system is "upstream" from another component in the system if the one component supplies power to the other component or is at a higher level in the system than the other component. For example, an electrical substation supplying power to a data center may be upstream from the data center, or a transformer may be upstream from a UPS.

Power distribution systems in data centers often include uninterruptible power supplies (UPSs) that provide a reserve power source for a limited period of time in case electrical power is not available from another power source such as a primary power source or a generator. Most data centers maintain UPSs at a full charge and include power systems that are configured to automatically supply electrical power from batteries of the UPSs in case of a loss of power from a primary power source. However, often anomalies and failures related to batteries and/or UPS systems are only detected during a power failure when a loss of primary power occurs and a UPS system fails to provide reserve power. In addition, in many instances utility power provider electrical power pricing varies between day and night or between peak and non-peak periods. In addition, some utility power providers charge for electrical power based on overall consumption, e.g. per kilowatt-hour, and also charge for electrical power based on peak pricing, e.g. based on peak flow in kilowatts during a period of time, such as during 15 minute increments during a day. Thus power costs may be reduced by timing power consumption to take place during non-peak periods or during parts of the day when power prices are lower than other parts of the day. Also, power costs may be reduced by reducing peak power flows (e.g. reducing the highest recorded power flows during increments of the day to be lower highest recorded power flows (such as peak kilowatts recorded during 15 minute increments during a day). Also, loss of power events due to failures of reserve power systems components such as UPSs may be avoided by proactively identifying failures and/or anomalies related to UPS systems while utility power is available to power electrical loads coupled with the UPS systems.

In some embodiments, a control system such as a building management system (BMS), a control system included in a UPS, or a combination of a BMS working with a control system included in a UPS, is configured to proactively cause power to be consumed from a power storage of a UPS, such as a battery, for a given period of time even though electrical power is available to be routed from a utility power source, via the UPS, to electrical loads downstream of the UPS. During the given period of time, anomalies and failures related to the UPS may be detected by monitoring performance of the UPS while electrical power is being consumed from the power storage of the UPS. Also, in the event of a failure or anomaly associated with the UPS, electrical power can be rerouted to the electrical loads associated with the UPS from a utility power source without causing a loss of power event due to the anomalies and/or failures associated with the UPS. In some embodiments, a power storage of a UPS may be any power storage that is configured to store energy that can be used at a later time, such as batteries, high energy capacitors, etc.

For example, a control system may cause electrical power to be fed from a battery of a UPS for a given period of time. At the beginning of the period of time, the battery of the UPS may fail to provide an adequate flow of electrical power from the UPS, the control system may detect the failure and or anomaly associated with the UPS and automatically reroute electrical power to electrical loads associated with the UPS without causing a loss of power event at the loads associated with the UPS. As another example, a control system may cause electrical power to be fed from a battery of a UPS for a given period of time or until a condition is met, such as the battery of the UPS falling below a threshold level of charge. Subsequently the control system may cause electrical power to be routed to electrical loads associated with the UPS via the UPS and may coordinate a timing of recharging the power storage of the UPS. For example, the control system may cause electrical power to be fed from a battery of the UPS, wherein the battery of the UPS is drained from 100% charge to 80% charge during a peak cost period for consuming electrical power from a utility power provider. The control system may delay recharging the battery of the UPS until a non-peak time for consuming electrical power from the utility power provider. For example, the control system may cause the battery of the UPS to be drained during the day and re-charged at night. In a data center comprising many UPS systems, a difference between peak and non-peak electrical pricing may add up to significant savings for the data center over a period of time.

For example, in some embodiments, a data center may include multiple data center zones wherein each data center zone includes a portion of a power system and electrical loads that receive electrical power from the portions of the power system. Also, each data center zone may include one or more UPSs in the respective portions of the power system. The one or more UPSs of each respective data center zone may provide power support to the electrical loads in each of the respective data center zones in case electrical power from a power source that supplies the respective data center zones is not available. The data center may also include a reserve power system that is configured to provide reserve power support to electrical loads of each respective data center zone in the event electrical power is not received at the electrical loads. The reserve power system may be over-subscribed so that the reserve power system has a reserve capacity sufficient to provide power to electrical loads of one or more of the data center zones but insufficient capacity to provide electrical power to all of the data center zones simultaneously. In some embodiments, a control system of a data center may be configured to proactively cause power to be consumed from a power storage of a UPS in a particular data center zone and may coordinate with other data center zones such that power is not caused to be consumed from a power storage of another data center zone in the data center until a UPS of a preceding data center zone that has provided electrical power to electrical loads associated with the UPS in the preceding data center zone has been recharged.

In some embodiments, a control system may be configured to coordinate when a power storage of a UPS is recharged such that recharging the power storage of the UPS takes place when consuming electrical power from a utility power source is less expensive than other times. For example, consuming electrical power from a utility power source may be more expensive during a particular portion of a day, such as the afternoon, than during another portion of the day, such as the night. A control system may cause electrical power to be consumed from a power storage of a UPS during the more expensive portion of the day, such as the afternoon, and may delay recharging the power storage of the UPS until a less expensive portion of the day, such as the night.

In some embodiments, a control system may meter a rate at which a power storage of a UPS is recharged in order to optimize reliability and/or power costs. For example, a metered rate may be determined to avoid peak power consumption charges from a utility power source, and a control system may meter a recharge of a power storage of a UPS such that electrical power used to recharge the power storage of the UPS does not exceed a threshold recharge rate. Also, in some embodiments, a control system may monitor an overall power consumption rate from a utility power source for a data center zone, a whole data center, or a combination of portions of a data center and may meter a recharge rate of a power storage of a UPS such that the overall power consumption rate does not exceed one or more thresholds. In some embodiments, a control system may be configured to recharge a power storage of a UPS such that the power storage is recharged above a threshold charge within a threshold amount of time. For example, a control system may be configured to recharge a power storage of a UPS such that the UPS is recharged to at least 80% charge within a given amount of time, such as 10 minutes, an hour, several hours, etc.

In some embodiments a control system, may coordinate between UPSs in multiple data center zones of a data center. For example, a control system may temporarily stop electrical power from being supplied to a UPS of a particular data center zone of multiple data center zones and cause electrical power to be routed from respective UPS power storages of the UPSs in the respective data center zones according to a schedule. For example a data center may include multiple data center zones and a UPS of one of the data center zones may feed electrical power to electrical loads in that data center zone for a period of time on a first day and another data center zone may feed electrical power to electric loads in the other data center zone for a period of time on a subsequent day after a power storage of the UPS in the first data center zone has been recharged. In some embodiments, a control system may cause a UPS of a data center zone to feed electrical power to electrical loads in the data center zone for a period of time based on a threshold being exceed. For example a control system may cause electrical power to be fed to electrical loads from a UPS of a data center zone for a period of time in response to a power consumption cost exceeding a cost threshold. Also, in some embodiments a control system may abort or skip feeding electrical power to electrical loads in a data center zone in response to determining electrical power from a utility power source is unreliable or unstable, in response to determining a power storage of a UPS is failed or experiencing one or more anomalies, or due to another reason.

FIGS. 1A-1C illustrate a power system of a data center that is feeding electrical power from a utility power source to an electrical load via a UPS, a control system of the data center causing a switching device to discontinue routing electrical power to the UPS for a period of time while electrical power from the power source is still available and the UPS providing electrical power from a battery of the UPS during the period of time and while electrical power is still available from the utility power source, and finally the control system causing the switching device to reroute electrical power to the UPS from the utility power source, wherein the electrical power from the utility power source flows to the electrical load and a portion of the electrical power from the utility power source recharges the battery of the UPS, according to some embodiments.

For example, in FIG. 1A a utility power source feeds electrical power via an uninterruptible power supply to loads in a data center. Data center 102 receives electrical power from power source 104 via connection 1222 and includes switching devices 106 electrically coupled to power source 104. Switching devices 106 are also electrically coupled to UPS 108. Power distribution unit (PDU) 110 is electrically coupled to UPS 108 downstream of UPS 108 and distributes electrical power to loads 112 in racks 114. In some embodiments, PDU 110 is a floor power distribution unit and racks 114 further include one or more rack level PDUs that distribute electrical power in ones of racks 114. Data center 102 also includes control system 118. In some embodiments, a control system, such as control system 118, may be implemented as part of a building management system (BMS) for data center 102. In some embodiments, a portion of a control system may be implemented as part of a UPS control system, such as control system 120 of UPS 108. In some embodiments, some portions of control may be performed by a BMS, such as control system 118, while other portion of control may be performed by a control system of a UPS, such as control system 120. In some embodiments some portions of control may be performed in coordination between a control system of a UPS, such as control system 120 and a BMS, such as control system 118.

In FIG. 1A, switching device 106 is configured such that electrical power from power source 104 is routed to electrical loads 112 via UPS 108. In FIG. 1B, in response to a command from control system 118, switching device 106 discontinues to route electrical power from power source 104 to electrical loads 112 even though electrical power is still available to be routed from power source 104 to UPS 108 via connection 122. Note in FIG. 1B the bold face line between power source 104 and switching device 106 illustrates that electrical power from utility power source 104 is available and at connection 122 suitable to be fed to UPS 108 while switching device 106 discontinues to route electrical power from power source 104 to electrical loads 112 via UPS 108. Instead electrical power from power storages (e.g. batteries) of UPS 108 supply electrical power to electrical loads 112. In FIG. 1C, subsequent to a given period of time, control system 118 causes switching device 106 to reroute electrical power from power source 104 to electrical loads 112 via UPS 108 and PDU 110. A portion of the electrical power from power source 104 routed to UPS 108 recharges batteries 116 of UPS 108.

A control system, such as control system 120, may cause a switching device to cause electrical power to be proactively routed to electrical loads from a power storage of a UPS even though electrical power from a utility power source is available and suitable to be routed to the electrical loads via the UPS. For example, the electrical power from the utility power source may meet one or more criteria related to reliability and/or stability and nevertheless electrical power may be caused to proactively be routed to the electrical loads from a power storage of a UPS.

In some embodiments, a building management system, such as control system 116, or a UPS control system, such as UPS control system 120, meters a rate at which a power storage, such as batteries 116, of a UPS, such as UPS 108, are recharged. In some embodiments, a BMS may work in coordination with a UPS control system to meter a rate at which a power storage of a UPS is recharged. For example, a BMS may command a UPS control system to recharge a power storage of a UPS at a particular rate, and the UPS control system of the UPS may control power flow into the power storage of the UPS in accordance with the particular rate. In some embodiments, a BMS may monitor power storage conditions of a power storage that is being recharged and may command a UPS control system to change a rate at which the power storage of the UPS is being recharged. In some embodiments, a UPS control system may meter a rate at which a power storage of the UPS is recharged without receiving commands indicating a rate from a BMS.

Figure 2:
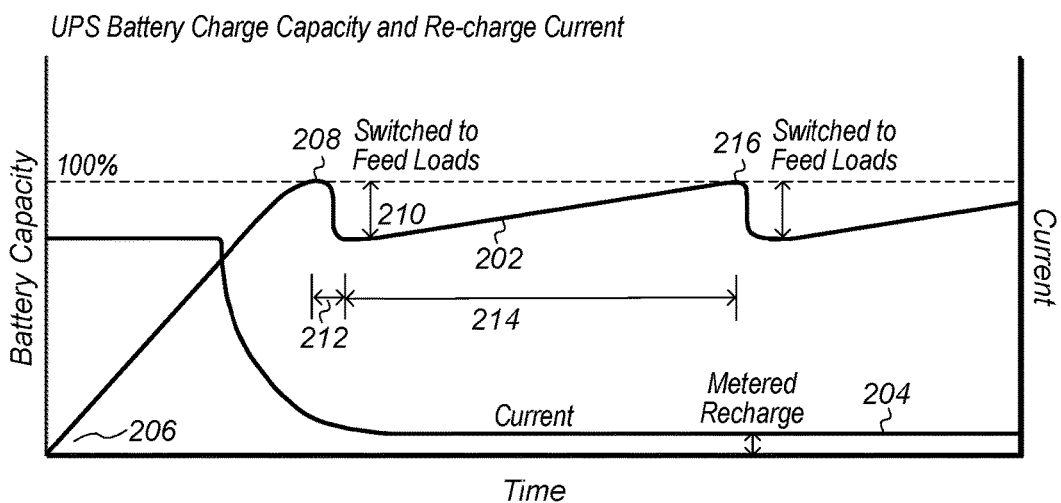
FIG. 2 is a graph illustrating a power storage being charged to a full charge, the power storage temporarily feeding electrical power to electrical loads, and subsequently the power storage being recharged at a metered rate, according to some embodiments.

FIG. 2 is a graph illustrating power storage of a UPS being charged to a full charge, the power storage feeding electrical power to electrical loads for a period of time, and subsequently the power storage being recharged at a metered rate, according to some embodiments.

In FIG. 2, line 202 illustrates a capacity of a power storage of a UPS, such as a capacity of batteries 116 of UPS 108, to provide electrical power to electrical loads, such as loads 112 over a period of time. Line 204 illustrates a current flow into a power storage of a UPS, such as a current flow into batteries 116 of UPS 108, over the same period of time. At 206 the power storage of the UPS is initially charged from an uncharged state and at 208, the power storage of the UPS reaches a full charge. In some embodiments, a power storage of a UPS may be a battery such as a Li-ion battery, a lead-acid battery, a high power capacitor, or other suitable energy store. In some embodiments, a power storage of a UPS may initially be charged at a constant current to a threshold level of charge and subsequently be charged at a constant voltage. In some embodiments, a power storage of a UPS may be charged in different stages.

At 210 a switching device upstream of a UPS is switched such that a power source no longer provides electrical power from the power source to the power storage of the UPS. For example, switching device 106 of FIG. 1 may be switched such that electrical power is not routed from utility power source 104 to UPS 108 for a period of time, such as period of time 212 in FIG. 2. During period of time 212 electrical power may be provided to electrical loads from a power storage of a UPS. For example as shown in FIG. 1, electrical power may be provided to electrical loads 112 from batteries 116 of UPS 108. Also as discussed in regard to FIG. 1, a control system of a data center may be configured to command a switching device to discontinue routing electrical power to a UPS, while electrical power is available to be fed to the UPS from a utility power source. This may cause electrical power to be fed to electrical loads associated with the UPS from a power storage of the UPS while electrical power is available to be routed to the UPS from the utility power source. For example, electrical power may be available to be routed to power storages of a UPS during time period 212 during which electrical power is discharged from a power storage of a UPS.

Subsequent to the given period of time 212 and during time period 214, the power storage of the UPS is recharged using a portion of electrical power supplied to the UPS from a utility power source. For example, as shown in FIG. 1C, subsequent to a given period of time in which a UPS supplies electrical power from a power storage of the UPS, a control system, such as control system 118, may command a switching device, such as switching device 106, to reroute electrical power to the UPS, such as UPS 108. A portion of the electrical power supplied to the UPS from the utility power source may recharge the power storage of the UPS, such as batteries 116 of UPS 108. In some embodiments, the electrical power from the utility power source provided to recharge the power storage of the UPS may be metered. For example, control system 120 of UPS 108 may control a rate at which current flows into batteries 116 to recharge batteries 116.

In some embodiments, a current flow into a power storage of a UPS may be metered such that the amount of electrical power provided to the UPS does not exceed a threshold, such as a standard loading of the data center zone in which the UPS is located. In some embodiments, a power storage of a UPS may consume a small amount of electrical power when fully charged to maintain a full charge and a standard loading of a UPS may include an amount of electrical power provided to electrical loads that are downstream of the UPS and the small amount of electrical power consumed to maintain the power storage of the UPS at a full charge. In such embodiments, the threshold may be based on the amount of electrical power historically provided to electrical loads downstream of the UPS and a historical amount of electrical power consumed to maintain a power storage of the UPS at full charge.

At 216, a control system of a data center that includes the UPS and the switching device may cause the switching device to discontinue routing electrical power to the UPS for another period of time in a similar manner as described in regard to 210. In some embodiments, a control system may discontinue routing electrical power to a UPS such as described in regard to 210 and 216 according to a schedule such as once per day, once per week, twice per week, etc. In some embodiments, a data center may include multiple data center zones each with their own UPS and a control system of the data center, such as a BMS, that schedules periods of time in which electrical power supplied to loads in respective ones of the data center zones are to be fed electrical power from the respective UPSs in the data center zones according to a coordinated sequence. For example, a first data center zone may be instructed to feed electrical power from a UPS of the first data center zone on a first day, a second data center zone may be instructed to feed electrical power from a UPS of the second data center zone on a second day, etc. In some embodiments, a sequence may repeat such that after the last data center zone in the sequence has fed electrical power to electrical loads in that data center zone from a UPS of the data center, the sequence reverts back to a first data center zone.

In some embodiments, a control system, such as a BMS or a control system of a UPS, may be configured to coordinate recharging of a power storage of a UPS such that the power storage of the UPS is recharged during a period of time when electrical power from a utility power source is less expensive than other periods of time. For example, in some instances electrical power provided from a utility power source may be less expensive at night than during the day. A control system, such as a BMS, may cause electrical power to be fed to electrical loads from a power storage of a UPS during the day and may delay recharging the power storage of the UPS until the night time when electrical power from the utility power source is less expensive.

Figure 3:
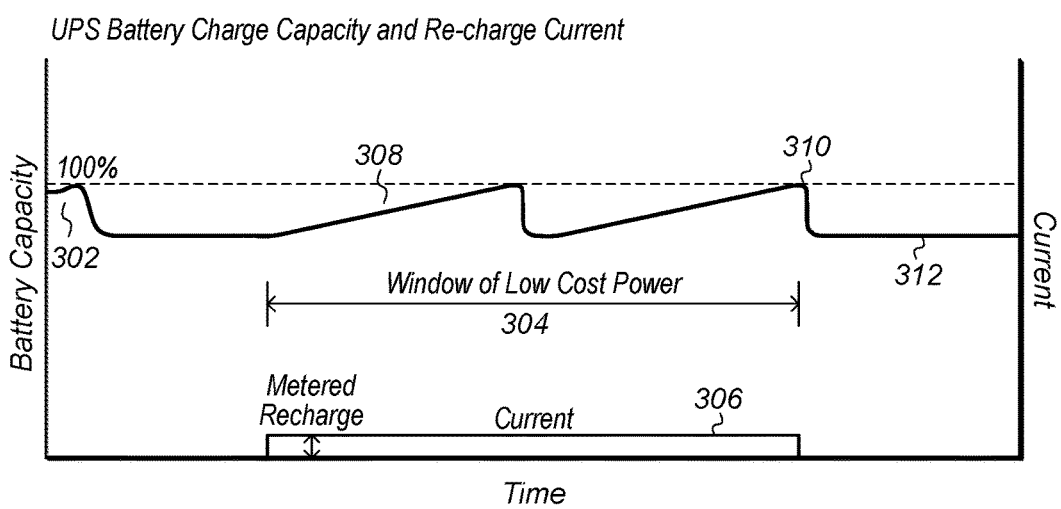
FIG. 3 is a graph illustrating a power storage temporarily feeding electrical power to electrical loads, and subsequently being recharged in coordination with utility power pricing at a metered rate such that the power storage is recharged during a low cost time period for consuming electrical power from a utility power source, according to some embodiments.

For example, FIG. 3 is a graph illustrating a power storage of a UPS feeding electrical power to electrical loads for a period of time, and subsequently being recharged in coordination with utility pricing at a metered rate such that the battery is recharged during a low cost time period for consuming electrical power from a utility power source, according to some embodiments.

Line 312 represents a charge (e.g. 0% charge to 100% or full charge) of a power storage of a UPS, according to some embodiments. Line 312 may be a charge in batteries 116 of UPS 108. At 302 electrical power is fed to electrical loads from a power storage of a UPS causing the charge capacity of the UPS to drop below a full charge. However, electrical power from a utility power source may be expensive at 302 and a control system may wait until period of time 304 when electrical power from the utility power source is less expensive to recharge the power storage of the UPS. Line 306 represents an amount of current being provided to a power storage of a UPS to recharge the UPS. As can be seen at 308, line 306 indicates that electrical power is being directed to the power storage of the UPS during period of time 304 to recharge the power storage of the UPS using less expensive electrical power than electrical power at 302. In some embodiments, a power storage of a UPS may be recharged at a metered rate such as a constant current. For example, line 306 illustrates a constant current re-charge of the power storage of the UPS. In some embodiments, a power storage of a UPS may be recharged in stages, wherein during a first stage the power storage of the UPS is recharged at a constant current and in a subsequent stage the power storage of the UPS is recharged at a constant voltage.

In some embodiments, a control system may cause electrical power to be fed from a power storage of a UPS during a period of time when electrical power is less expensive and the control system may begin recharging the power storage of the UPS subsequent to providing electrical power to the electrical loads from the UPS without delaying recharging the power storage. For example, electrical power is supplied from a power storage of a UPS during period of time 304 when electrical power from the utility power source is less expensive and the control system does not delay recharging the power storage of the UPS subsequent to feeding electrical power to electrical loads from the power storage of the UPS.

In some embodiments, a recharge of a power storage of a UPS may be suspended if costs associated with electrical power from a utility power source exceed a threshold. For example, at 310 electrical power is fed to electrical loads from a power storage of a UPS during period of time 304 when electrical power from the utility power source is less expensive, but recharging of the power storage of the UPS is suspended when period of time 304 ends and electrical power from the utility power source becomes more expensive.

In some embodiments, a control system may be configured to control recharge of a power storage of a UPS such that the power storage of the UPS is recharged above a threshold level of charge within a threshold amount of time.

Figure 4:
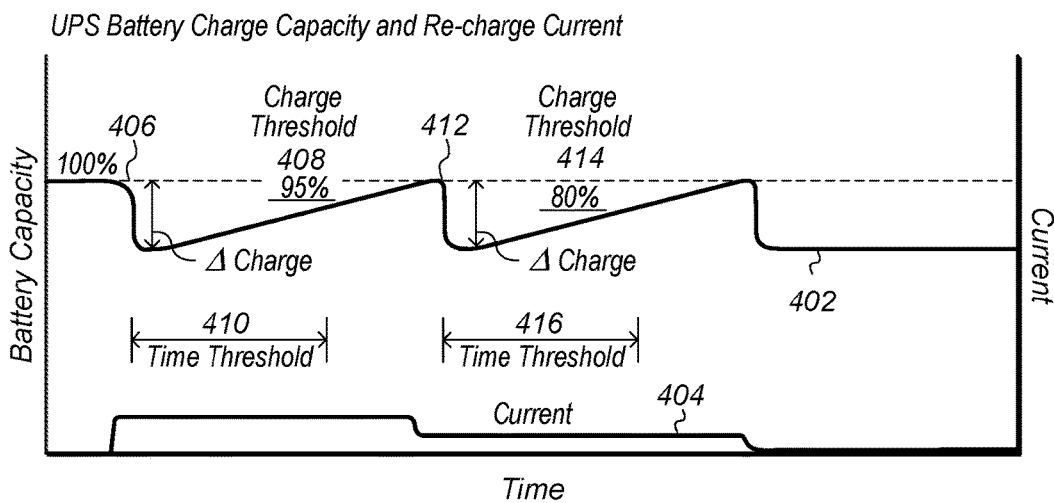
FIG. 4 is a graph illustrating a power storage feeding electrical power to electrical loads for a period of time, and subsequently being recharged at a metered rate to a threshold charge in a given amount of time, according to some embodiments.

For example, FIG. 4 is a graph illustrating a battery feeding electrical power to electrical loads for a period of time, and subsequently being recharged at a metered rate to a threshold charge in a given amount of time, according to some embodiments.

Line 402 represents a charge (e.g. 0% charge to 100% or full charge) of a power storage of a UPS, according to some embodiments. Line 402 may be a charge in batteries 116 of UPS 108. Line 404 represent a current flow into the power storage of the UPS, according to some embodiments. At 406 electrical power is fed to electrical loads from a power storage of the UPS causing the charge capacity of the UPS to drop below a full charge. Subsequent to electrical power being fed to electrical loads from the power storage of the UPS, electrical power from a utility power source may be rerouted to flow through the UPS, and a portion of the electrical power from the utility power source may recharge the power storage of the UPS. In some embodiments, a control system of a UPS, such as control system 120 of UPS 108 may be configured to recharge a power storage of UPS, such as batteries 116 of UPS 108, to a threshold level of charge within a threshold amount of time. For example, a threshold level of charge may be 95% charge, a threshold amount of time, may be a certain number of hours, a day, or some other amount of time. In FIG. 3, the power storage whose charge is represented by line 402 is recharge to charge threshold 408 (95% charge) within time threshold 410.

In some embodiments, a control system may meter a recharge of a power storage of a UPS in accordance with a selected metering rate. For example, a control system may select a fast metering rate under a particular set of conditions and may select a slower metering rate under another set of conditions. For example, a control system of a UPS may work in conjunction with a BMS to select a metering rate to avoid peak consumption charges. As an example, during a period of high electrical consumption from a utility power source, a control system working in conjunction with a BMS may select a slower metered recharge for recharging a power storage of a UPS than a period of time of low electrical consumption from a utility power source. For example as illustrated in FIG. 4, at 412 electrical power is fed to electrical loads from a power storage of the UPS causing the charge capacity of the UPS to drop below full charge. Subsequently, electrical power from a utility power source is rerouted to flow through the UPS, and a portion of the electrical power from the utility power source recharges the power storage of the UPS. In some embodiments, a control system of a UPS may meter a recharge of a power storage of the UPS at a lower rate than the rate during time period 410. Also, a charge threshold may be a lower level of charge than charge threshold 408. For example, a threshold level of charge may be 80% charge, and a threshold amount of time may be a longer amount of time than time threshold 410. For example, subsequent to 412, the power storage whose charge is represented by line 402 may be recharged to charge threshold 414 (80% charge) within time threshold 416. As can be seen in FIG. 4, current may be flow into a power storage of a UPS at a lower flow rate subsequent to 412 during time period 416 than the flow rate of current subsequent to 406 during time period 410.

In some embodiments, a control system may meter a recharge of a power storage of a UPS such that an overall amount of electrical power (or current flow) from a utility power source is maintained below a threshold level. In some embodiments, a BMS may coordinate between multiple UPS control systems in multiple UPSs in multiple data center zones to maintain an overall data center power flow from a utility power source below a threshold level. An overall current flow from a utility power source to a UPS, data center zone, or a data center may include electrical power being fed to electrical loads that receive electrical power from the UPS, from multiple UPSs in a data center zone, or from a set of UPSs in a whole data center. In some embodiments, a control system may only recharge power storages of a UPS or of sets of UPSs when an overall power current flow to electrical loads is less than the threshold. For example, a threshold current flow may be 10 amps and a current flow to electrical loads fed by a particular UPS may be 8 amps, in such case, a control system of the UPS may meter a recharge rate of a power storage of the UPS to not exceed 2 amps, such that the overall current flow to the UPS does not exceed the threshold of 10 amps. If current flow to electrical loads fed by the particular UPS increases to 9 amps, a control system of a UPS may reduce a metered recharge rate of power storages of the UPS to a rate that does not exceed 1 amp, such that the overall current flow to the UPS is maintained below the threshold of 10 amps. Note, that the current values are given only as examples, and in some embodiments, a threshold, a current flow to electrical loads, and a metered recharge rate may be different values. Also, in some embodiments, a similar current threshold may be managed at a data center zone level, wherein the data center zone includes multiple UPSs, may be managed at an overall data center level, or may be managed at some other level of a power infrastructure of a data center.

Figure 5:
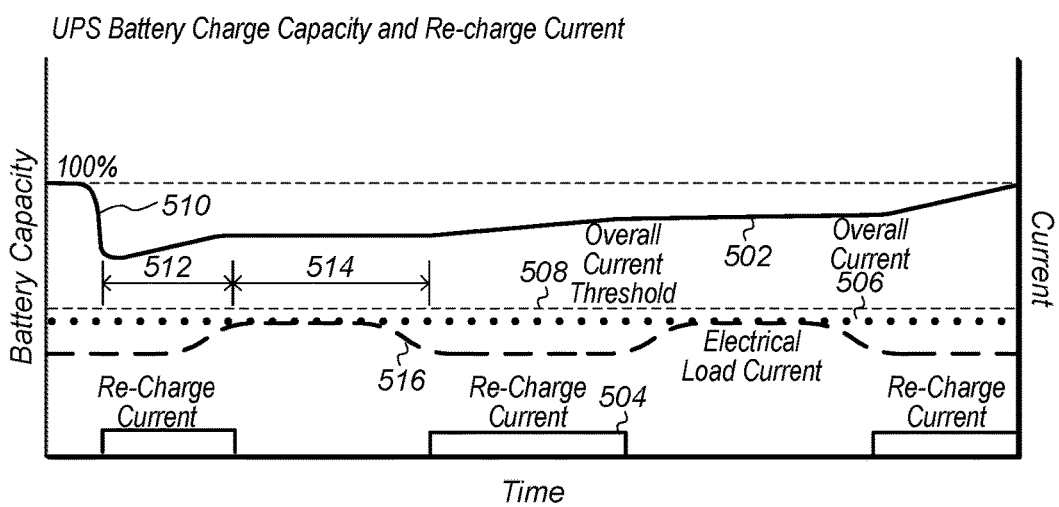
FIG. 5 is a graph illustrating a power storage feeding electrical power to electrical loads for a period of time, and subsequently being recharged at a metered rate that is controlled such that an overall power flow from a utility power source does not exceed a threshold, according to some embodiments.

For example, FIG. 5 is a graph illustrating a power storage feeding electrical power to electrical loads for a period of time, and subsequently being recharged at a metered rate that is controlled such that an overall power flow from a utility power source does not exceed a threshold, according to some embodiments. Line 502 represents a charge (e.g. 0% charge to 100% or full charge) of a power storage of a UPS, according to some embodiments. Line 502 may be a charge in batteries 116 of UPS 108. Lines 504 represent a current flow into the power storage of the UPS, according to some embodiments. Line 506 represents on overall current flow into the UPS including a current flow into the power storage of the UPS and a current flow through the UPS to electrical loads that are fed electrical power from the UPS. Line 508 represents on overall current threshold for current supplied to the UPS from a utility power source. At 510 electrical power is fed to electrical loads from a power storage of the UPS causing the charge capacity of power storage of the UPS to drop below a full charge. Subsequent to electrical power being fed to electrical loads from the power storage of the UPS, electrical power from a utility power source may be rerouted to flow through the UPS, and a portion of the electrical power from the utility power source may recharge the power storage of the UPS. In some embodiments, a control system of a UPS, such as control system 120 of UPS 108 may be configured to recharge a power storage of UPS, such as batteries 116 of UPS 108, and may be controlled in coordination with a BMS of a data center in which the UPS is located to maintain an overall current supplied to the UPS below an overall current threshold. For example, during period of time 512 current is directed to the power storage of the UPS such that overall current flow 506 does not exceed overall current threshold 508. During period of time 514, current flow 516 to electrical loads that are fed electrical power from the UPS increases to the level of overall current threshold 508, and the control system of the UPS reduces the metered charge rate of the recharge of the power storage of the UPS, such that the overall current flow 506 does not exceed overall current threshold 508 (e.g. the control system suspends recharging the power storage of the UPS while the current flow to the electrical loads that are fed from the UPS is at or near the overall current threshold). During period of time 514, the overall current flow to the electrical loads that are fed electrical power from the UPS reduces and the control system of the UPS resumes recharging the power storage of the UPS.

In some embodiments, the period of time depicted in FIG. 5 may span multiple days and a control system may partially recharge a power storage of a UPS at night while electrical power is less expense and suspend recharging the power storage of the UPS during the day when the electrical power is more expensive. The control system may then resume recharging the battery of the UPS during a subsequent night when electrical power from a utility power source is less expensive. In some embodiments, power consumption by electrical loads that are fed from a UPS may fluctuate over different time periods or may follow different patterns and a control system of a UPS may adjust a metered recharge rate of a UPS in accordance with the different patterns.

In some embodiments, a reserve power system may provide reserve power support to electrical loads in different data center zones. For example, FIG. 6 is a block diagram illustrating a data center with multiple data center zones and a reserve power system, wherein a utility power source feeds electrical power via uninterruptible power supplies in the multiple zones to electrical loads in the multiple zones and the reserve power system provides reserve power support to the multiple zones, according to some embodiments.

Figure 6:
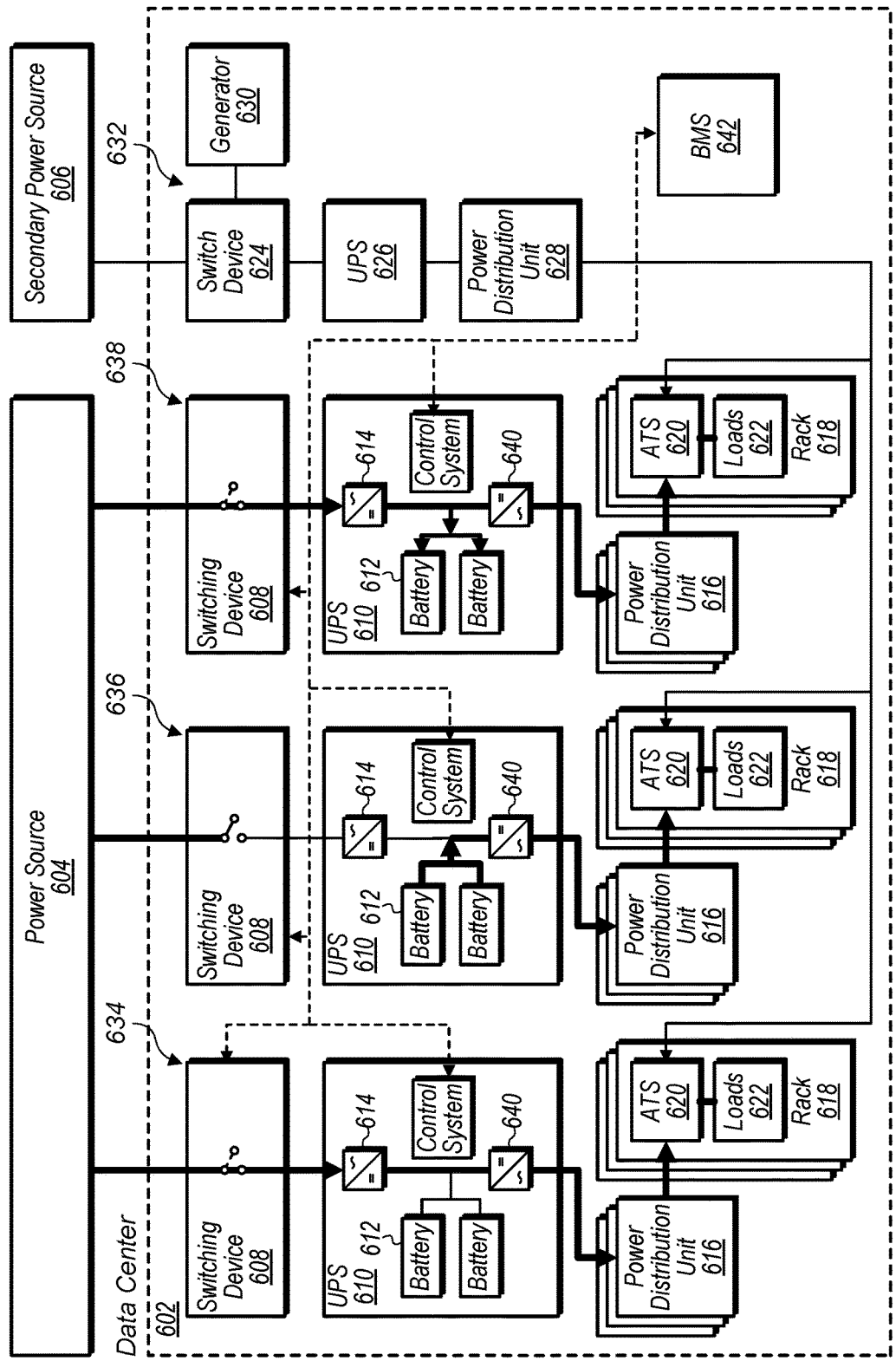
FIG. 6 is a block diagram illustrating a data center with multiple data center zones and a reserve power system, wherein a utility power source feeds electrical power via uninterruptible power supplies in the multiple zones to electrical loads in the multiple zones and the reserve power system provides reserve power support to the multiple zones, according to some embodiments.

In FIG. 6, data center 602 receives electrical power from power source 604 and secondary power source 606. In some embodiments, power source 604 may be a utility power provider and power source 606 may be a different utility power provider. In some embodiments, power source 606 may be a local generator and data center 602 may not include an additional generator 630. In some embodiments, a data center may receive electrical power from a primary power source and a secondary power source and include a generator, such as generator 630.

In some embodiments, a data center may include multiple data center zones and a reserve power system may provide reserve power support to the different data center zones. For example, reserve power system 632 provides reserve power support to data center zones 634, 636, and 638. Reserve power system 632 includes switching device 624 coupled with secondary power source 606 and generator 630. Switching device 624 is also electrically coupled with UPS 626 of reserve power system 632. Switching device 624 may include one or more switching mechanisms configured to selectively route power to UPS 626 from secondary power source 606 or generator 630. In some embodiments, a reserve power system may not include a connection to a secondary power source and may rely on a generator, such as generator 630, to provide reserve power support along with a UPS of the reserve power system, such as UPS 626 of reserve power system 632. A reserve power system may also include a power distribution unit such as floor power distribution unit that is electrically coupled with automatic transfer switches associated with different respective sets of loads. For example, reserve power system 632 includes power distribution unit (PDU) 628 that is electrically coupled with automatic transfer switches (ATSs) 620 in racks 618. Each of data center zones 634, 636, and 638 includes a switching device 608 electrically coupled to power source 604 and electrically coupled to a UPS 610. In FIG. 6 each UPS 610 includes batteries 612, rectifier 614, and inverter 640. A rectifier, such as rectifier 614, may convert incoming electrical power from a power source, such as power source 604, from alternating current (AC) power into direct current (DC) power. DC power may be stored in a power storage of a UPS, such as batteries 612. Electrical power fed to downstream electrical loads from a power storage of a UPS, may be converted back to AC power before leaving a UPS. For example, electrical power fed from batteries 612 may be converted by inverter 640 into AC power before being fed to power distribution unit 616. In some embodiments, electrical power being fed through an UPS may bypass rectifier 614 and inverter 640 and only a portion of electrical power routed to UPS 610 that recharges batteries 612 may be converted from AC power to DC power in rectifier 614. A data center zone may also include floor and/or rack level power distribution units that distribute electrical power from a UPS to electrical loads in racks in the respective data center zone. For example, each of data center zones 634, 636, and 638 includes a PDU 616 that distributes electrical power to electrical loads 622 in racks 618. In addition, each data center zone, such as data center zones 634, 636, and 638, may include an automatic transfer switch (ATS), such as ATSs 620. An automatic transfer switch may be electrically coupled to an electrical feed from a primary power system that receives electrical power from a power source, such as power source 604, and may also be electrically coupled to a reserve power system, such as reserve power system 632. An automatic transfer switch may be configured to automatically switch from feeding electrical power from a primary power source to feeding electrical power from a reserve power source in response to a loss of power feed from the primary power source, and vice versa.

In some embodiments power storages of a group of UPSs may be electrically coupled together to form a common power storage. For example batteries 612 of multiple UPSs 610 may be electrically coupled together downstream of inverter 614 and upstream of inverter 640.

In some embodiments, a reserve power system, such as reserve power system 632, may be oversubscribed. An oversubscribed reserve power system may have a capacity to provide power to loads in one or more of the data center zones that receive reserve power support from the reserve power system, but may not have sufficient capacity to provide electrical power to all or a substantial portion of the electrical loads of the data center zones that receive reserve power support from the reserve power system at the same time. For example, reserve power system 632 may have sufficient capacity to provide electrical power to any one set of electrical loads in one of data center zones 634, 636, or 638. However reserve power system 632 may not have sufficient capacity to provide electrical power to electrical loads 622 in each of data center zones 634, 636, and 638 at the same time.

In some embodiments, a control system, such as BMS 642 may coordinate proactively supplying electrical power from power storages of UPSs, such as from batteries 612 of UPSs 610, such that the power storages of the UPSs are not drained below a reserve power capacity of a UPS of the reserve power system, such as UPS 626 of reserve power system 632. For example, UPSs 610 of data center zones 634, 636, and 638 may be designed to provide at least 5 minutes of reserve power capacity to loads 622. A control system such as, BMS 632, may coordinate proactively feeding electrical power from the power storages of the UPS such that UPS 626 of reserve power system has sufficient reserve power capacity to provide a difference between the designed 5 minutes of reserve power capacity and an actual power capacity of the UPSs while the UPSs are less then fully charged. Continuing the example, in one circumstance batteries 612 of UPS 610 in data center zone 634 may be drained to half charge, in addition, batteries 612 of UPS 610 in data center zone 636 may be drained to half charge. UPS 626 of reserve power system 632 may have an equivalent capacity as one of UPSs 610, such that when two UPSs have batteries at half charge, UPS 626 of reserve power system at full charge can compensate for the two UPSs at half charge such that the overall system still provides a designed level of reserve power capacity, e.g. 5 minutes of reserve power capacity. A control system, such as BMS 632, may delay proactively feeding electrical power from batteries 612 in UPS 610 of data center zone 638 until the batteries in data center zones 634 and 636 are sufficiently recharged such that UPS 626 of reserve power system 632 has sufficient capacity to make up any difference between fully charged UPSs and UPSs that have been proactively drained to a less than full charge.

In some embodiments, electrical power from a power source, such as power source 604, may be available and suitable to be routed to electrical loads in all or a majority of the data center zones of a data center, such as data center zones 634, 636, and 638. However, while the electrical power from the power source is available and suitable, a control system, such as BMS 642, may proactively cause a portion of the data center zones to not receive electrical power from the power source and instead feed electrical power from power storages of UPSs in the data center zones for a period of time. For example, in FIG. 6 electrical power is available and suitable to be fed to the loads 622 in each of data center zones 634, 636, and 638. However, BMS 642 causes switching device 608 of data center zone 636 to discontinue routing electrical power that is available and suitable from power source 604 to UPS 610 for a period of time.

While, data center zones have been described as each comprising a single UPS, and a reserve power system comprising a UPS with an equivalent capacity as UPSs in the different data center zones, in some embodiments various other configurations may be used. For example, a reserve power system may have sufficient reserve power capacity to support multiple data center zones. Also in some embodiments a data center zone may include multiple UPSs.

Figure 7:
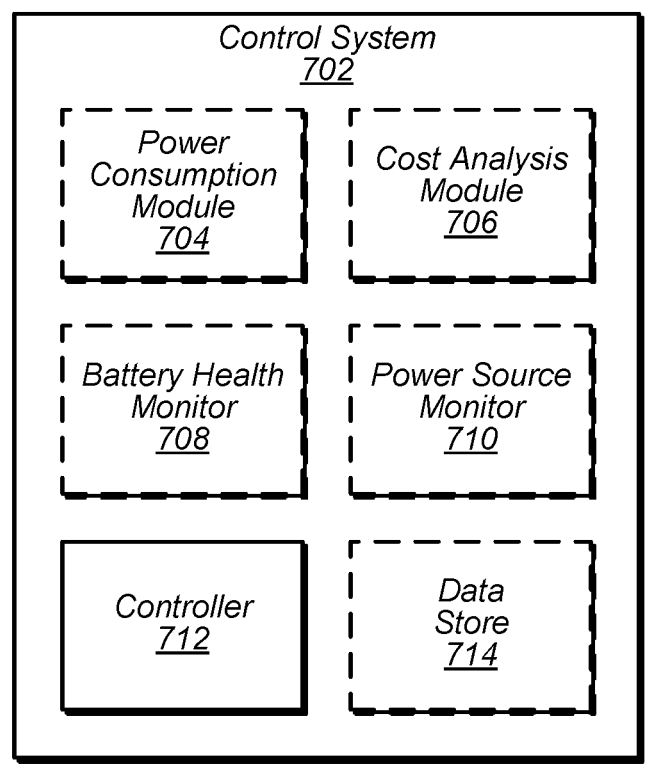
FIG. 7 is a schematic illustrating a control system which manages discharge and recharge of power storages of uninterruptible power supplies, according to some embodiments.

FIG. 7 is a schematic illustrating a control system which manages discharge and recharge of power storages of uninterruptible power supplies in a data center, according to some embodiments. Control system 702 includes power consumption monitor 704, cost monitor 706, battery health monitor 708, power source monitor 710, controller 712, and data store 714. In some embodiments, control system 702 may be a building management system in a data center that interfaces with a control system of one or more UPSs to manage the UPSs. In some embodiments some elements of control system 702 may be included in a control system of a UPS and other elements of control system 702 may be included in a BMS that interfaces with the control system of the UPS. For example, in some embodiments, a power consumption monitor, such as power consumption monitor 704 may be included in a control system of a UPS, and the control system of the UPS may provide information related to power consumption to a BMS that implements other elements of control system 702. In some embodiments, a controller of a control system 702 may be included in a control system of a UPS and may receive control set point information from a BMS. For example, a BMS may determine a metered recharge rate for recharging a power storage of a UPS and a control system of the UPS may control the recharge of the power storage in accordance with the control set point information received from the BMS. In some embodiments, a control system 702, may not include all the modules illustrated in FIG. 7. For example, power consumption module 704, cost analysis module 706, power source monitor 710, battery health monitor 708, and data store 714 may be omitted. In some embodiments, these modules may be included in additional systems that process data and share data with a control system, such as control system 702. These modules are illustrated with dotted lines to signify that in some embodiments, these modules may not be included in a control system, such as control system 702 or may be implemented by other systems that coordinate with control system 702.

In some embodiments, a power consumption monitor, such as power consumption monitor 704, may monitor rates of consumption of electrical power from a power source. For example, a power consumption monitor may monitor an amount of power consumption e.g. kilowatt-hours of electrical power consumed during a given period of time such as a day or a portion of a day. Also, a power consumption monitor may monitor a rate of power consumption, e.g. a peak rate of power flow such as peak kilowatts in an increment of time such as 15 minute increments. A power consumption monitor may share power consumption information with a controller, such as controller 712. As discussed below, a controller, such as controller 712, may use power consumption information to time a recharge of a power storage of a UPS, determine when to discontinue routing electrical power to electrical loads from a utility power source via a UPS, such that the electrical loads are fed from power storages of the UPS, and may use power consumption information to determine a metered rate for recharging a power storage of a UPS.

In some embodiments, a control system, such as control system 702 may also include a cost monitor. A cost monitor of a control system may be connected to a network and receive updated cost information in regard to power pricing for electrical power received from a utility power provider. A cost monitor may provide cost information to a controller, such as controller 712, and the controller may utilize the cost information when determining when to discontinue routing electrical power to electrical loads from a utility power source via a UPS, such that the electrical loads are fed from power storages of the UPS, and when determining a metered rate for recharging a power storage of a UPS. Also cost information may be used to determine when to perform a recharge of a power storage of a UPS.

In some embodiments, a control system, such as control system 702 may also include a battery health monitor, such as battery health monitor 708. A battery health monitor may monitor one or more variables related to battery health such as battery temperature, battery voltage, battery current flow, and various other parameters indicative of the health of a battery. In some embodiments, a control system may determine a state of health of a battery prior to discontinuing to route electrical power to electrical loads from a utility power source via a UPS, such that electrical loads are fed from batteries of the UPS. In response to determining a battery is failed or that battery health indicates one or more anomalies associated with the battery, the control system may abort a scheduled or planned rerouting of electrical power from the batteries and instead may continue to route electrical power to one or more electrical loads downstream of a UPS that includes the batteries without discontinuing to route electrical power to the electrical loads from the utility power source. In some embodiments, in response to detecting a failure or anomaly associated with a battery or other power storage of a UPS, a control system, such as control system 702 may issue a warning to data center personnel. For example, control system 702 may be implemented within a larger BMS system and may issue an alarm to the BMS system that is then displayed to data center personnel. In some embodiments, after discontinuing to route electrical power to electrical loads from a utility power source and causing electrical power to be fed to the one or more electrical loads from batteries of a UPS, a battery health monitor, such as battery health monitor 708 may continue to monitor the health of batteries of the UPS. The battery health monitor may abort a planned period of time in which routing of electrical power from a utility power source was to be discontinued and may cause switching devices to reroute electrical power to one or more electrical loads prior to a given period of time expiring in which routing of electrical power from the utility power source was to be discontinued. In a similar manner as described above, a control system, such as control system 702 may issue an alarm to data center personnel alerting the data center personnel of the failure and/or anomaly associated with the battery.

In some embodiments, a control system, such as control system 702, may include a power source monitor, such as power source monitor 710. A power source monitor may monitor electrical power received from a utility power source. The power source monitor may coordinate with a controller, such as controller 712, to conditionally perform an instance of discontinuing to route electrical power from the utility power source to a UPS and causing electrical power to be fed to electrical loads from a power storage of the UPS, based on the condition that electrical power being received from the utility power source satisfies one or more reliability criteria. In response to determining electrical power received from the utility power source does not meet one or more reliability criteria, a power source monitor, such as power source monitor 710, may coordinate with a controller, such as controller 712 to skip a planned period of time in which routing electrical power from the utility power source was to be discontinued. Also in response to determining electrical power received from the utility power source does not meet one or more reliability criteria, an ongoing period of discontinuing to feed electrical power from the utility power source may be aborted or cut short. For example, a power source monitor may determine that one or more waveforms associated with electrical power from the utility power sourced indicate the utility power source is unstable. In response to determining the electrical power from the utility power source does not meet a reliability criteria such as a level of stability, a power source monitor may interact with a controller to prevent the controller from causing a power storage of a UPS to be proactively drained. In this way, if the utility power source becomes unavailable due to the detected gap in reliability, UPSs of the data center will have sufficient stored charge to supply electrical power to electrical loads in the event of a loss of utility power. Also, in some embodiments, a control system, such as control system 702, may change a metered rate of recharge of power storages of UPSs controlled by a controller of the control system in response to determining electrical power from a utility power source does not meet one or more reliability criteria. For example, in response to determining electrical power being received from a utility power source is unstable, a control system may cause recharge rates of power storages controlled by the control system to accelerate such that the power storages are recharged more quickly.

A controller, such as controller 712, may interact with the various monitors of a control system as described above and generate control signals that cause a switching device to route electrical power to electrical loads via a UPS and also generate control signals that cause a switching device to discontinue routing electrical power to one or more electrical loads from a utility power source while electrical power is available from the utility power source. In some embodiments, a controller may also control a metered recharge rate of a power storage of a UPS or interact with a separate controller that controls a metered recharge rate of a power storage of a UPS.

In some embodiments, a control system may include a data store, such as data store 714 that stores threshold information, control parameters, etc.

In some embodiments, a control system may be implemented on a process logic controller (PLC), as a hardware controller, or as software implemented on a computing system. In some embodiments a control system, such as control system 702 may be integrated into a BMS of a data center, integrated into a control system of a UPS, or may be implemented in part on both a BMS and a controls system of a UPS.

Figure 8:
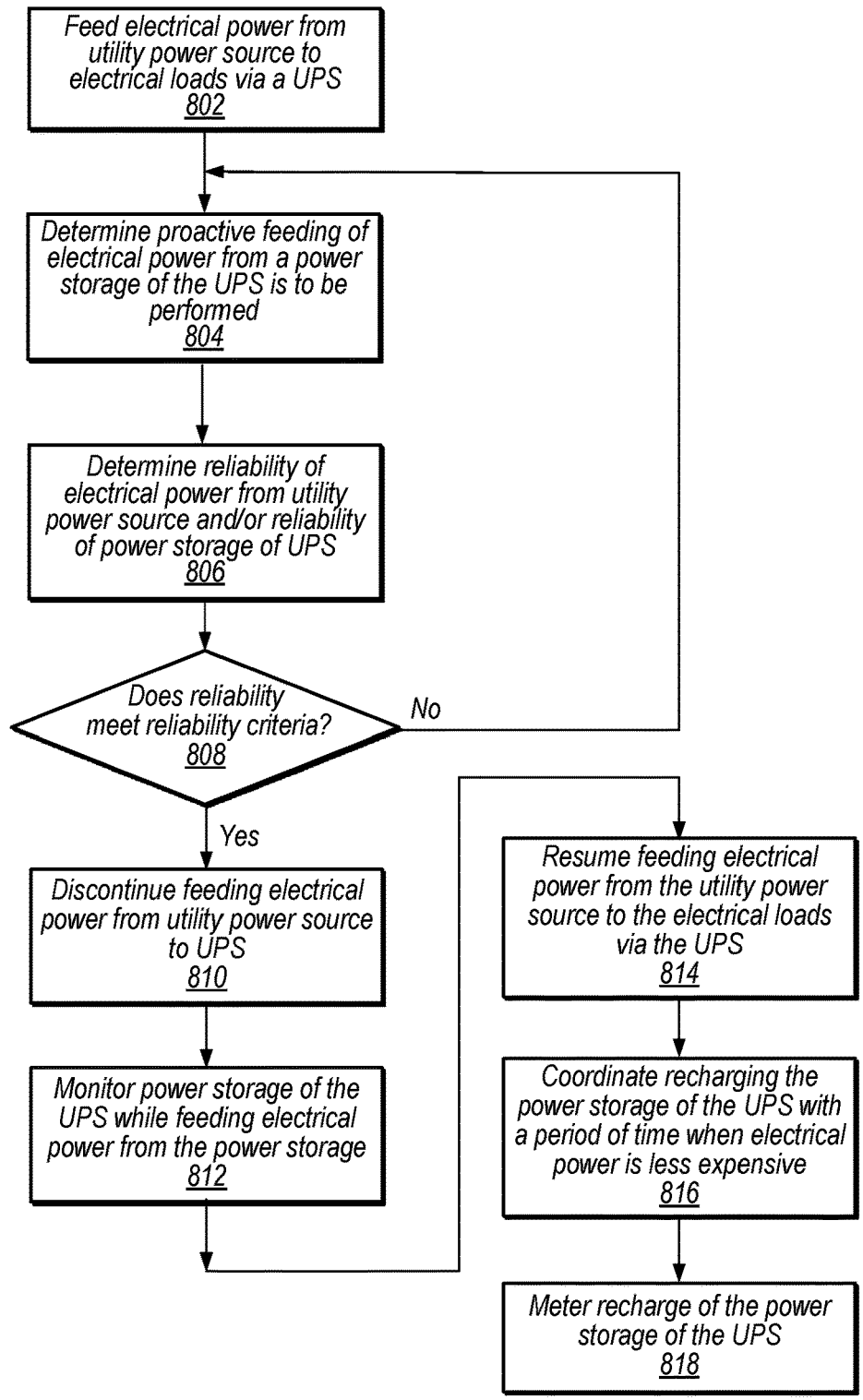
FIG. 8 is a flow diagram illustrating a control system managing discharge and recharge of a power storage of uninterruptible power supplies, according to some embodiments.

FIG. 8 is a flow diagram illustrating a control system managing discharge and recharge of a power storage of uninterruptible power supplies, according to some embodiments. At 802 electrical power is fed from a utility power source to electrical loads via a UPS. In some embodiments, a control system may control a switching device electrically coupled between a connection to the utility power source and the UPS. The control system may be configured to command the switching device to route electrical power from the utility power source to the electrical loads via the UPS and may be configured to command the switching device to discontinue routing electrical power from the utility power source to the electrical loads via the UPS. The UPS may include one or more power storages, such as batteries, that are configured to feed electrical power to the electrical loads when electrical power is not being routed to the electrical loads from the utility power source.

At 804, it is determined that an instance of proactively feeding electrical power from the power storage of the UPS is to be performed. For example, a control system may be configured to proactively feed electrical power from a power storage of a UPS for a given period of time according to a schedule. For example, a schedule may be once per day, once per week, etc. In some embodiments, a control system may be configured to proactively feed electrical power from a power storage of a UPS for a given period of time according to a sequence and/or a schedule. For example, a data center may include multiple zones and each zone may be scheduled to perform proactive feeding of electrical power from power storages of UPSs in the respective zones at different times in a sequence. For example, a first zone may be scheduled for a first day, a second zone may be scheduled for a second day, etc. In some embodiments, the sequence may by repeated on an ongoing basis.

In some embodiments, a control system may be configured to proactively feed electrical power from a power storage of a UPS for a given period of time based on one or more criteria being met. For example, a control system may be configured to determine a current cost associated with receiving electrical power from a utility power source and in response to the current cost of receiving electrical power from the utility power source exceeding a cost threshold, the control system may determine that electrical is to be proactively fed from a power storage of a UPS for a given period of time.

At 806, one or more reliability variables are determined for electrical power being received from the utility power source. For example, a stability such as a waveform stability, power factor, or other metric indicative of the reliability of electrical power from the utility power source may be determined. In addition, in some embodiments, one or more reliability variables related to the power storage of the UPS may be determined. For example, the control system may determine that a level of charge (e.g. capacity) of the power storage exceeds a threshold. In some embodiments, the control system may store condition information, and may verify that condition information indicates that the power storage is in good health. For example, during a previous instance of proactively feeding electrical power from a power storage of a UPS, the power storage may have overheated. A control system may store a marker indicating that the power storage previously overheated. If the marker has not been cleared this may be a reliability criteria indicating poor reliability of the power storage. In some embodiments, to clear previous alarms related to power storages of UPSs, data center personnel may investigate the cause of the alarm and may clear an alarm marker after resolving the cause of the alarm.

At 808 it is determined if the reliability variables determined in 806 meet one or more reliability criteria. In response to determining the reliability variables do not satisfy the one or more reliability criteria, the control system may skip performing proactively feeding electrical power from the power storage of the UPS and revert back to 804.

In response to determining at 808 that the reliability variables determined at 806 meet one or more reliability criteria, at 810 the control system may cause a switching device to discontinue routing electrical power from the utility power source to the UPS for a period of time. During the period of time, electrical power may be fed to electrical loads coupled with the UPS from the power storage of the UPS.

At 812, the control system may monitor the power storage of the UPS while electrical power is being fed to the electrical loads from the power storage of the UPS. The control system may detect one or more anomalies associated with the power storage of the UPS while electrical power is being fed from the power storage of the UPS. For example, the control system may determine a voltage of the UPS, a current flow from the UPS, or other electrical properties of electrical power being fed from the UPS due not meet one or more electrical parameters for electrical power to be fed from the UPS. Also, in some embodiments, a control system may determine a temperature or other property of the power storage of the UPS does not meet one or more expected parameters. In response to determining the properties of the electrical power being fed from the UPS and/or in response to determining a property of the power storage of the UPS does not meet one or more expected parameters, the control system may diagnose one or more anomalies associated with the power storage of the UPS. In response to detecting and/or diagnosing the one or more anomalies, the control system may cause the switching device to resume feeding electrical power to the electrical loads from the utility power source prior to the given period of time expiring. In some embodiments, the control system may also issue an alert indicating the anomaly associated with the UPS and or the power storage of the UPS.

At 814, subsequent to the given period of time or due to one or more conditions being satisfied, the control system may cause the switching device to resume feeding electrical power from the utility power source to the electrical loads via the UPS. For example, in some embodiments, the control system may proactively feed electrical power from a power storage of a UPS until the level of charge in the power storage of the UPS falls below a threshold level of charge. In some embodiments, a control system may proactively feed electrical power from a power storage of a UPS for a set period of time, such as 1-5 minutes, or some other suitable amount of time.

At 816, a control system may coordinate recharging of a power storage of a UPS such that the power storage of the UPS is recharged during a period of time when electrical power from a utility power source is less expensive than other periods of time. For example, a control system may proactively feed electrical power from a power storage of a UPS during the daytime when electrical power is more expensive and may coordinate recharging of a power storage of a UPS to take place at night when electrical power from a utility power source is less expensive.

At 818, a control system may meter recharging of a power storage of a UPS. As discussed above, in some embodiments, a control system may be implemented in a building management system of a data center and may instruct a control system in a UPS to recharge a power storage of the UPS at a particular rate. In some embodiments, a recharging of a power storage of a UPS may be metered such that electrical power consumed to recharge the power storage remains below a threshold current flow. In some embodiments, recharging of a power storage of a UPS may be metered such that an overall current flow to a UPS that includes current flow to loads that coupled to the UPS and current flow to recharge the power storage of the UPS remains below a threshold overall current. In some embodiments, others thresholds may be used to meter recharging a power storage of a UPS.

Figure 9:
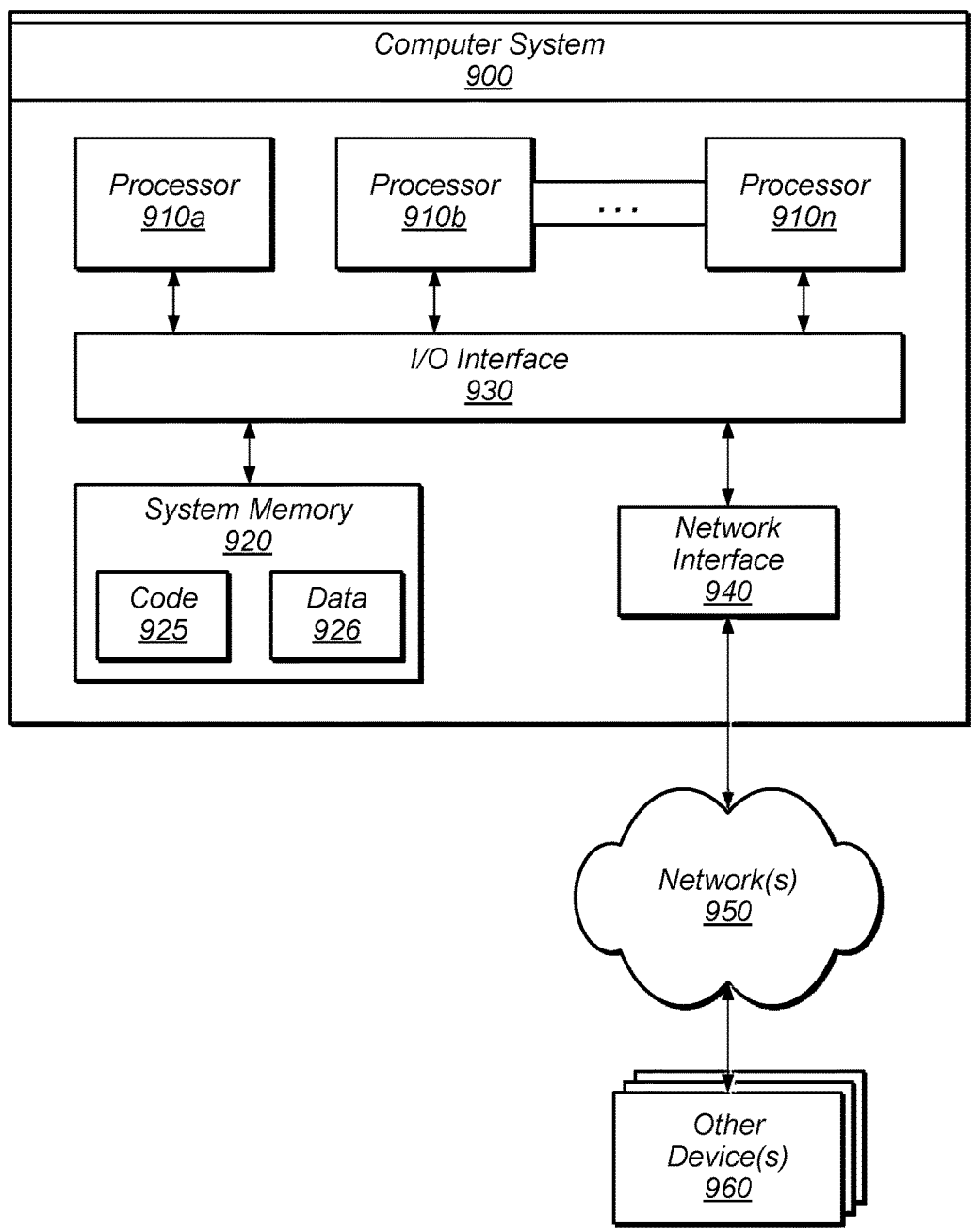
FIG. 9 is a block diagram illustrating an example computer system that may be used in some embodiments.

FIG. 9 is a block diagram illustrating an example computer system that may be used in some embodiments.

In some embodiments, a system that implements a portion or all of one or more of the technologies, including but not limited to a portion or all of the control systems including a UPS control system and a BMS control system, systems and components associated with the control systems, and various methods, systems, components, devices, and apparatuses as described herein, may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as a portion or all of one or more of the technologies, including but not limited to a portion or all of the control systems, systems and components associated with the control systems, and various methods, systems, components, devices, and apparatuses as described herein, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIGS. 1 through 8, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data for implementing embodiments of methods as described above relative to FIGS. 1-8. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A data center, comprising:
   an electrical load;
   a connection to a utility power source that supplies electrical power to the data center;
   an uninterruptible power supply (UPS) electrically coupled to the utility power source, via the connection, and electrically coupled to the electrical load;
   a switching device electrically coupled between the connection to the utility power source and the UPS, wherein the switching device is configured to selectively route electrical power from the utility power source to the UPS; and
   a control system, wherein the control system is configured to:
      command, while electrical power is available to be routed to the electrical load from the utility power source via the connection to the utility power source and suitable for operating the electric load, the switching device to discontinue routing electrical power from the utility power source to the electrical load via the UPS for a given period of time; and
      subsequent to the given period of time, command the switching device to route electrical power from the utility power source to the electrical load via the UPS;
      determine a metered battery recharge rate such that an overall rate of electrical power consumption from the utility power source during recharge of the battery does not exceed a threshold power consumption rate; and
      instruct the UPS to recharge the battery according to the determined metered battery recharge rate,
   wherein the UPS is configured to:
      supply, from a battery of the UPS, electrical power to the electrical load during the given period of time and while electrical power is available to be routed to the UPS from the utility power source; and
      subsequent to the given period of time, recharge the battery of the UPS, according to the determined metered battery recharge rate, with electrical power routed to the UPS from the utility power source.

2. The data center of claim 1, wherein the control system is configured to coordinate timing of the recharge of the battery of the UPS such that the battery of the UPS is recharged when electrical power from the utility power source is less expensive than during the given period of time.

3. The data center of claim 1, wherein the electrical load, the UPS, and the switching device are part of a data center zone, wherein the data center further comprises:
one or more additional data center zones, wherein each data center zone comprises:
a respective electrical load;
a respective UPS electrically coupled to the utility power source and electrically coupled to the respective electrical load of the respective data center zone; and
a respective switching device electrically coupled between the utility power source and the respective UPS of the respective data center zone, wherein the respective switching device of the respective data center zone is configured to selectively route electrical power from the utility power source to the respective UPS of the respective data center zone;
wherein the control system is further configured to:
command, while electrical power is available to be routed to the electrical loads of the data center zones, a given switching device of a given data center zone to discontinue routing electrical power from the utility power source to a given electrical load of the given data center zone for a particular period of time; and
subsequent to the particular period of time, command the given switching device to route electrical power from the utility power source to the given electrical load of the given data center zone;
wherein the given UPS of the given data center zone is configured to:
supply, from a battery of the given UPS, electrical power to the given electrical load of the given data center zone during the particular period of time; and
subsequent to the particular period of time, recharge the battery of the given UPS with electrical power routed to the given UPS from the utility power source;
wherein the data center further comprises a reserve power system comprising a reserve UPS, wherein the reserve power system is configured to provide uninterruptible power support to the electrical loads of one of the respective data center zones from the reserve UPS.

4. A method, comprising:
feeding electrical power from an electrical power source via an uninterruptible power supply (UPS) to an electrical load in a data center;
discontinuing to feed the electrical power from the electrical power source to the UPS while electrical power is available from the electrical power source and suitable for operating the electric load in the data center and instead feeding electrical power to the electrical load in the data center from a power storage of the UPS;
resuming to feed electrical power from the electrical power source via the UPS to the electrical load in the data center; and
recharging the power storage of the UPS at a metered rate such that an overall rate of electrical power consumption from the electrical power source does not exceed a threshold power consumption rate.

5. The method of claim 4, wherein the metered rate is determined such that the power storage is recharged at a rate that is less than or equal to a threshold recharge rate.

6. The method of claim 4, further comprising:
coordinating recharge of the power storage of the UPS with a cost of receiving electrical power from the electrical power source such that the power storage of the UPS is recharged when electrical power from the electrical power source is less expensive than during a period of time when the feed from the electrical power source is more expensive.

7. The method of claim 4, further comprising:
adjusting the metered rate of recharge of the power storage, such that the power storage is recharged above a threshold level of charge in a threshold amount of time.

8. The method of claim 4, further comprising:
prior to discontinuing to feed the electrical power from the electrical power source to the UPS, determining a cost associated with the electrical power from the electrical power source exceeds a threshold,
wherein said discontinuing to feed electrical power from the electrical power source to the UPS is performed in response to determining the cost exceeds the cost threshold.

9. The method of claim 4, wherein said discontinuing to feed the electrical power from the electrical power source to the UPS is performed in accordance with a schedule.

10. The method of claim 4, further comprising:
monitoring the power storage of the UPS while electrical power is fed to the electrical load in the data center from the power storage of the UPS; and
in response to detecting an anomaly related to the power storage of the UPS while monitoring the power storage of the UPS, resuming to feed electrical power from the electrical power source and issuing an alert indicating the anomaly related to the power storage of the UPS.

11. The method of claim 4, further comprising:
prior to discontinuing to feed the electrical power from the electrical power source to the UPS, determining a reliability variable associated with electrical power from the electrical power source satisfies a reliability criteria,
wherein said discontinuing to feed the electrical power from the electrical power source to the UPS is conditionally performed in response to determining the reliability variable meets the reliability criteria.

12. The method of claim 4, wherein the power storage of the UPS is a high energy capacitor.

13. A non-transitory computer-readable medium storing program instructions that, when executed on a computing device, cause the computing device to:
receive condition information about electrical power being fed from a utility power source via an uninterruptible power supply (UPS) to an electrical load in a data center;
determine the electrical power being fed from the utility power source meets a reliability criteria;
in response to determining the electrical power of the utility power source meets the reliability criteria, generate a control signal causing a switching device coupled between the electrical power source and the UPS to stop feeding electrical power to the UPS until a given condition is met;
subsequent to the condition being met, generate a control signal causing the switching device coupled between the electrical power source and the UPS to resume feeding electrical power to the UPS; and
generate a control signal to control a rate at which the UPS recharges a power storage of the UPS subsequent to the switching device resuming electrical power flow from the electrical power source to the UPS, wherein the rate is metered such that an overall rate of electrical power consumption during recharge of the UPS does not exceed a threshold power consumption rate.

14. The non-transitory computer-readable storage medium of claim 13, wherein the given condition is a given amount of time.

15. The non-transitory computer-readable storage medium of claim 13, wherein the given condition is a charge remaining in a power storage of the UPS falling below a threshold charge.

16. The non-transitory computer-readable storage medium of claim 13, wherein the program instructions, when executed on the computing device
   coordinate timing of the recharging of the UPS such that the recharging of the UPS is performed when a cost associated with electrical power from the electrical power source is less than a cost threshold.

17. The non-transitory computer-readable storage medium of claim 13, wherein the program instructions, when executed on the computing device, further cause the computing device to:
   receive condition information from the UPS relating to power storage performance of a power storage of the UPS; and
   determine the given condition,
   wherein the given condition comprises the power storage of the UPS not meeting a performance threshold.

\* \* \* \* \*